(12) United States Patent
Eylem et al.

(10) Patent No.: US 7,160,647 B2
(45) Date of Patent: Jan. 9, 2007

(54) BATTERY CATHODE

(75) Inventors: Cahit Eylem, Bellingham, MA (US); Nikolay Iltchev, Norfolk, MA (US); Stuart M. Davis, Norfolk, MA (US); Ou Mao, Walpole, MA (US)

(73) Assignee: The Gillette Company, Boston, MA (US)

( * ) Notice: Subject to any disclaimer, the term of this patent is extended or adjusted under 35 U.S.C. 154(b) by 625 days.

(21) Appl. No.: 10/745,025

(22) Filed: Dec. 22, 2003

(65) Prior Publication Data

US 2005/0136328 A1    Jun. 23, 2005

(51) Int. Cl.
- H01M 4/00 (2006.01)
- H01M 6/04 (2006.01)
- H01M 4/50 (2006.01)
- H01M 4/42 (2006.01)
- H01M 4/58 (2006.01)

(52) U.S. Cl. ............ 429/220; 429/206; 429/224; 429/229; 429/231.5; 429/231.6

(58) Field of Classification Search .......... 429/220, 429/224, 231.5, 231.6, 206, 229
See application file for complete search history.

(56) References Cited

U.S. PATENT DOCUMENTS

| | | | |
|---|---|---|---|
| 274,110 A | 3/1883 | De Lalande | 429/206 |
| 345,124 A | 7/1886 | DeVirloy et al. | 429/207 |
| 3,893,870 A | 7/1975 | Kozawa | 136/107 |
| 4,777,100 A | 10/1988 | Chalilpoyil et al. | 429/59 |
| 5,112,783 A | 5/1992 | Sugise et al. | 501/126 |
| 5,300,371 A | 4/1994 | Tomantschger et al. | 429/60 |
| 6,284,410 B1 | 9/2001 | Durkot et al. | 429/229 |
| 6,342,317 B1 | 1/2002 | Patel et al. | 429/176 |
| 6,500,576 B1 | 12/2002 | Davis et al. | 429/227 |
| 6,521,378 B1 | 2/2003 | Durkot et al. | 429/229 |
| 6,858,349 B1 | 2/2005 | Luo et al. | 429/232 |
| 2002/0172867 A1 | 11/2002 | Anglin | |
| 2003/0207173 A1 | 11/2003 | Wang et al. | |
| 2003/0207174 A1 | 11/2003 | Nanjundaswamy et al. | |
| 2003/0211392 A1 | 11/2003 | Nanjundaswamy et al. | |
| 2004/0175613 A1 | 9/2004 | Eylem et al. | |
| 2005/0079424 A1 | 4/2005 | Davis et al. | |

FOREIGN PATENT DOCUMENTS

| | | |
|---|---|---|
| CA | 1263697 | 12/1989 |
| DE | 22702 | 6/1880 |
| FR | 143644 | 6/1881 |
| GB | 20960 | 1/1901 |
| WO | WO 95/33687 | * 12/1995 |

OTHER PUBLICATIONS

Adelsberger, K. et al., "High-Pressure Synthesis and Electrochemical Investigation of $Ag_2Cu_2O_3$", J Solid State Chem 158:82-86 (2001).

(Continued)

*Primary Examiner*—Patrick Joseph Ryan
*Assistant Examiner*—Thomas H. Parsons
(74) *Attorney, Agent, or Firm*—Fish & Richardson P.C.

(57) ABSTRACT

Batteries are disclosed. In some embodiments, a battery has a cathode that includes $Cu_xM_yO_zX_t$, where M is a metal, X includes one or more halides and/or nitrate, x+y is from about 6.8 to about 7.2, and z and t are selected so that the copper in $Cu_xM_yO_zX_t$ has a formal oxidation state of +2 or greater.

81 Claims, 9 Drawing Sheets

OTHER PUBLICATIONS

Arjomand, M. et al., "Oxide Chemistry. Part II. Ternary Oxides Containing Copper in Oxidation States-I, -II, -III, and -IV", J Chem Society Dalton, 1061-1066 (1975).

Brese N.E. et al., "Crystal Structures of $NaCuO_2$ and $KCuO_2$ By Neutron Diffraction", J Solid State Chem 83:1-7 (1989).

Curda, J, et al., "$AgCuO_2$—Synthesis, Crystal Structure. and Structural Relationships with CuO and $Ag^I Ag^{III} O2$", J Solid State Chem 162:220-224 (2001).

de Lalande, F. et al., "Electricity-New Copper Oxide Battery", Compt Rend 97, 164 (1993) (original and English translation).

Falk, S. Uno et al., "Alkaline Storage Batteries", Chapter 1-Historical Introduction, John Wiley & Sons, Inc., pp. 1-41.

Friedman, T.L. et al., "Electrochemistry in Molten Hydroxides: Synthesis of $NaCuO_2$", J Solid State Chem 109:203-204 (1994).

Gomez-Romerao, P. et al., "$Ag_2Cu_2O_3$: The First Silver Copper Oxide", Angew Chem Int Ed 38(4):524-525 (1999).

Hayakawa, H. et al., "Crystal Structure of New Compounds, $Cu_6O_8Cu_2X$ (X=Cl, $NO_3$)", Jpn J Appl Phys 30(7B):L1303-1306 (1991).

Hayakawa, H. et al., "Crystal Structure of New Metallic Compound $Cu_6O_8$ InCl", Jpn J Appl Phys 29(10):L1796-1798 (1990).

Hayakawa, H. et al., "Refinement of the Crystal Structures of $Cu_6O_8$.InCl and $Cu_6O_8Cu_2$Cl by Neutron Powder Diffraction", J Ceramic Soc of Jpn Int Edition 101:745-751 (1993).

Heise, G. W. et al., "The Primary Battery", Chapter 4, John Wiley & Sons, Inc., New York, pp. 191-205 (1971).

Mingmei, Wu et al., "Preparation and Properties of $BaCuO_{2.5}$ and Its Related Oxides", J Solid State Chem. 110:389-392 (1994).

Muñoz-Rojas, D. et al., "Electrochemically Induced Reversible Solid State Transformations: Electrosynthesis of $Ag_2Cu_2O_4$ by Room Temperature Oxidation of $Ag_2Cu_2O_3$", Electrochemistry Communications, 4:684-689 (2002).

Paranthaman, M. et al., "Preparation and Magnetic Properties of $Cu_6O_8$ InCl and $Li_xCu_6O_8$ InCl", J Solid State Chem 96:243-246 (1992).

Pickardt, J. et al., "Crystal Growth and Structure Refinement of $NaCuO_2$ by X-Ray and Neutron Diffraction", J Solid State Chem 89:308-314 (1990).

Whangbo, M. et al., "Spin Dimer Analysis of the Spin Exchange Interactions in Paramelaconite $Cu_4O_3$ and Its Analogue $Ag_2Cu_2O_3$ and the Spin Ordering of the $Cu_2O_3$ Spin Lattice Leading to Their Magnetic Phase Transitions", Inorg Chem 41:3570-3577 (2002).

Yazawa, I. et al., "The Synthesis and Formation Process of a New Cubic Conductive $Cu_7O_{8-y}(NO_3)$ Compound", Jpn J Appl Phys 29(8):L1480-1482 (1990).

Yazawa, I. et al., "The Synthesis of New Cubic Conductive $Cu_{7-x}O_{8-y}MX$ (M=In, Sc, $X=NO_3$, Cl) Compounds", Jpn J Appl Phys 29(9):L1693-1695 (1990).

Zouganelis, G. et al., "Structure Refinement of the $Cu_6O_8$ YCl Compound", Solid State Communications 80(9):709-713 (1991).

List of References [online], 81 pages. [Retrieved on Nov. 12, 2002] Retrieved from: the Thomson Derwent World Patent Index.

List of References [online], 61 pages. [Retrieved on Nov. 12, 2002] Retrieved from: the Thomson Derwent World Patent Index.

List of References [online], 59 pages. [Retrieved on Nov. 14, 2002] Retrieved from: the Thomson Derwent World Patent Index.

Falk, S.U. et al., Alkaline Storage Batteries, John Wiley & Sons, Inc., New York, 1969, p. 1-41.

Kordesch, K.V., Batteries, vol. 1, Manganese Dioxide, Marcel Dekker, Inc., New York, 1974, p. 390, Fig. 3.

Linden, D., Handbook of Batteries, McGraw-Hill, Inc., New York, 1995 "1.4 Classification of Cells and Batteries", pp. 1.9-1.11; "3.1 Factors Affecting Battery Performance". pp. 3.1-3.20; "7.1 General Characteristics and Applications of Primary Batteries", pp. 7.3-7.7; "23.1 General Characteristics and Applications of Secondary Batteries", pp. 23.3-23.12.

Copeland, et al., U.S. Appl. No. 09/645,632, filed Aug. 24, 2000.

\* cited by examiner

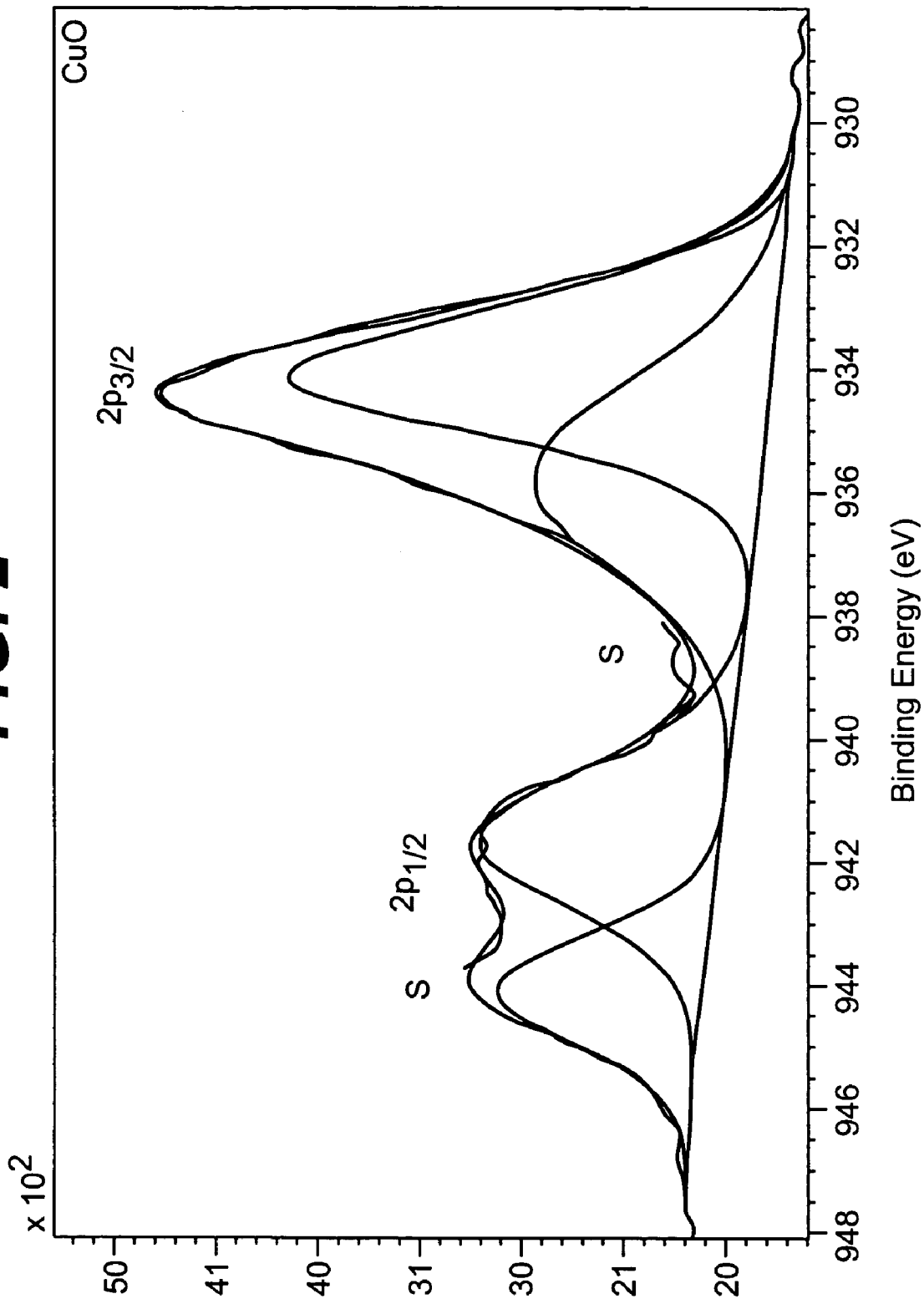

BATTERY CATHODE

TECHNICAL FIELD

The invention relates to batteries.

BACKGROUND

Batteries, such as alkaline batteries, are commonly used as electrical energy sources. Generally, a battery contains a negative electrode (anode) and a positive electrode (cathode). The anode contains an active material (e.g., zinc particles) that can be oxidized; and the cathode contains an active material (e.g., manganese dioxide) that can be reduced. The active material of the anode is capable of reducing the active material of the cathode. In order to prevent direct reaction of the active material of the anode and the active material of the cathode, the electrodes are electrically isolated from each other by a separator.

When a battery is used as an electrical energy source in a device, such as a cellular telephone, electrical contact is made to the electrodes, allowing electrons to flow through the device and permitting the respective oxidation and reduction reactions to occur to provide electrical power. An electrolyte in contact with the electrodes contains ions that flow through the separator between the electrodes to maintain charge balance throughout the battery during discharge.

SUMMARY

In one aspect, the invention features a battery with a cathode that includes $Cu_xM_yO_zX_t$ as a cathode active material, in which M is a metal, X includes one or more halides and/or nitrate, x+y=6.8–7.2, and z and t are selected to provide the copper with a formal oxidation state of +2 or greater. In some embodiments, the cathode includes both $Cu_xM_yO_zX_t$ and one or more second cathode active material(s), such as cupric oxide (CuO), cuprous oxide ($Cu_2O$), manganese dioxide ($MnO_2$), and/or nickel oxyhydroxide (NiOOH). A battery with a cathode that includes $Cu_xM_yO_zX_t$ can exhibit enhanced electrochemical performance (e.g., capacity, open circuit voltage, and/or closed circuit voltage) relative to a battery with a cathode that does not include $Cu_xM_yO_zX_t$ (e.g., a battery with a cathode that includes only CuO and/or $Cu_2O$ as cathode active material). Furthermore, a cathode that includes $Cu_xM_yO_zX_t$ can have a higher conductivity than a cathode that does not include $Cu_xM_yO_zX_t$.

In another aspect, the invention features a primary battery that includes a housing, an anode within the housing, a cathode within the housing, and an alkaline electrolyte. The cathode includes one cathode active material (e.g., CuO, $MnO_2$, NiOOH) and another cathode active material that includes $Cu_xM_yO_zX_t$, in which M is a metal, X includes one or more halides and/or nitrate, x+y is from about 6.8 to about 7.2, and z and t are selected so that the copper in $Cu_xM_yO_zX_t$ has a formal oxidation state of +2 or greater.

In another aspect, the invention features a battery that is a closed system and that includes a housing, an anode within the housing, an alkaline electrolyte within the housing, and a cathode within the housing. The cathode has a cathode active material that includes $Cu_xM_yO_zX_t$, in which M is a metal, X includes one or more halides and/or nitrate, x+y is from about 6.8 to about 7.2, and z and t are selected so that the copper in $Cu_xM_yO_zX_t$ has a formal oxidation state of +2 or greater.

In another aspect, the invention features a cathode with a cathode active material including less than about 40 percent by weight $Cu_xM_yO_zX_t$, in which M is a metal, X includes one or more halides and/or nitrate, x+y is from about 6.8 to about 7.2, and z and t are selected so that the copper in $Cu_xM_yO_zX_t$ has a formal oxidation state of +2 or greater.

Embodiments can include one or more of the following features.

M can be indium, gallium, arsenic, scandium, yttrium, bismuth, niobium, calcium, or a lanthanide.

X can be chlorine or nitrate.

In some embodiments, x+y can be about 6.8. In certain embodiments, x+y can be about 7.2.

The copper in $Cu_xM_yO_zX_t$ can have a formal oxidation state of +2.w, where +2.w is from +2.0 to +2.4 (e.g., from +2.2 to +2.4).

$Cu_xM_yO_zX_t$ can be $Cu_xIn_yO_zCl_t$. $Cu_xM_yO_zX_t$ can be $Cu_6InO_8Cl$.

The cathode active material can include less than about 35 percent by weight (e.g., less than about 30 percent by weight, less than about 25 percent by weight, less than about 20 percent by weight, less than about 15 percent by weight, less than about ten percent by weight, less than about five percent by weight, less than about two percent by weight, less than about one percent by weight) $Cu_xM_yO_zX_t$.

The cathode active material can include more than about 70 percent by weight (e.g., more than about 80 percent by weight, more than about 90 percent by weight, more than about 95 percent by weight, more than about 99 percent by weight) $Cu_xM_yO_zX_t$.

The cathode can include less than about ten percent by weight graphite (e.g., less than about five percent by weight graphite).

The cathode can include less than about two percent by weight carbon fibers (e.g., less than about 0.5 percent by weight carbon fibers).

The cathode active material can further include a copper oxide (e.g., CuO or $Cu_2O$), manganese dioxide, or nickel oxyhydroxide.

The cathode active material can include less than about 20 percent by weight $Cu_xM_yO_zX_t$ and more than about 80 percent by weight of a copper oxide, manganese dioxide, or nickel oxyhydroxide.

The cathode can have a Coulombic capacity of more than about 260 mAh/gram (e.g., more than about 450 mAh/gram).

The cathode active material can have a resistivity of less than about one Ohm-cm (e.g., less than about $10^{-2}$ Ohm-cm).

The battery can have an open circuit voltage of more than about 1.2 Volts (e.g., more than about 1.5 Volts).

The battery can have a closed circuit voltage of more than about 1.4 Volts on a load of one mA/gram of cathode active material. The battery can have a closed circuit voltage of more than about one Volt on a load of ten mA/gram of cathode active material.

The anode can include zinc.

The electrolyte can be an alkaline electrolyte.

Other aspects, features, and advantages of the invention will be apparent from the drawing, description, and claims.

DESCRIPTION OF DRAWINGS

FIG. 2 is a portion of an x-ray photoelectron spectrum for CuO.

DETAILED DESCRIPTION

Figure 1:
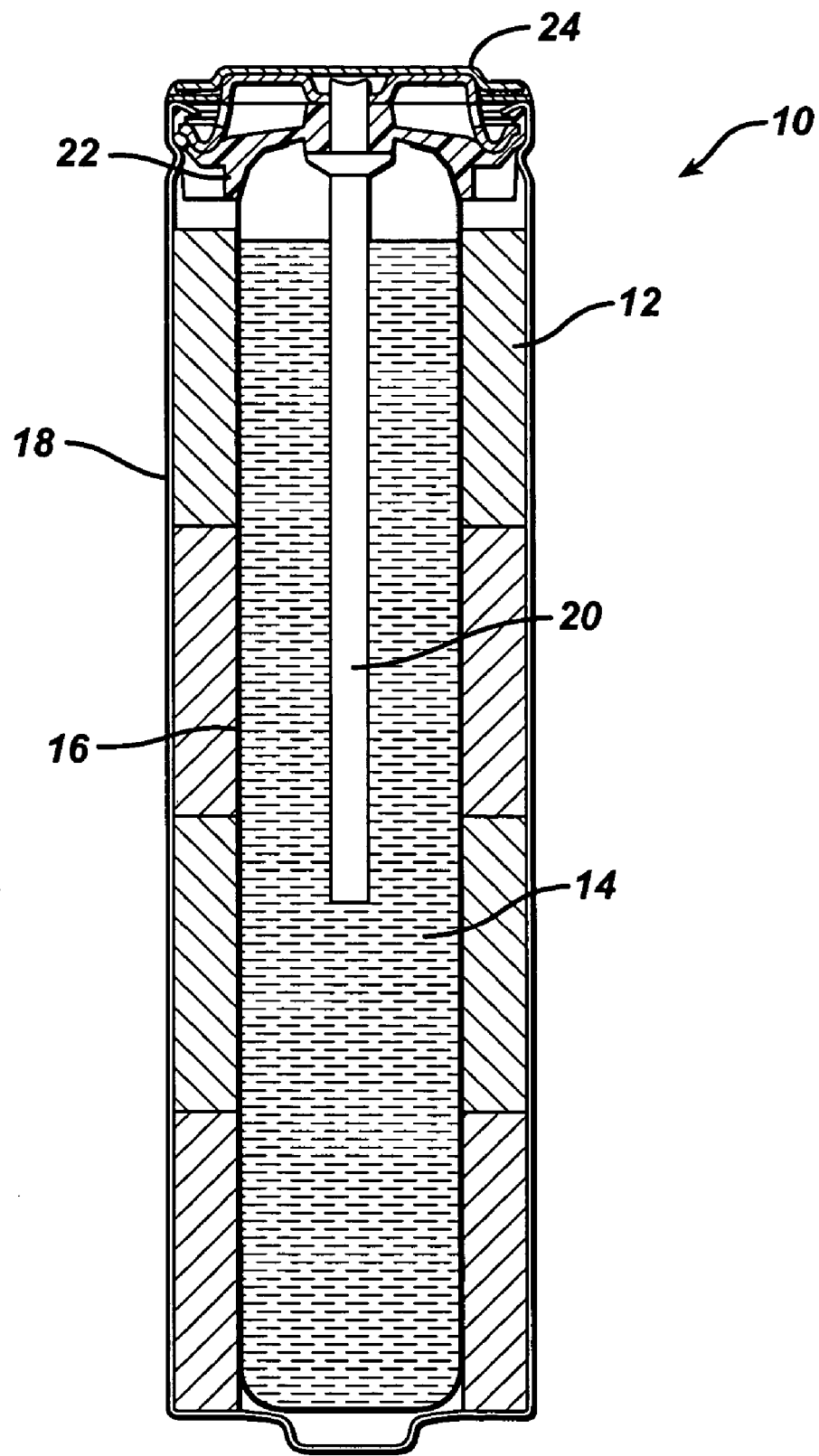
FIG. 1 is a cross-sectional view of an embodiment of a battery.

Referring to FIG. 1, a battery or electrochemical cell 10 has a cylindrical housing 18 containing a cathode 12, an anode 14, and a separator 16 between cathode 12 and anode 14. Cathode 12 includes a cathode active material, and anode 14 includes an anode active material. Battery 10 also includes a current collector 20, a seal 22, and a metal top cap 24, which serve as the negative terminal for the battery. Cathode 12 is in contact with housing 18, and the positive terminal of battery 10 is at the end of the battery opposite from the negative terminal. An electrolyte is dispersed throughout battery 10.

The cathode active material preferably includes a copper metal oxyhalide, a copper metal oxynitrate, or a copper metal compound that is both a copper metal oxyhalide and a copper metal oxynitrate. Preferably, the cathode active material includes $Cu_xM_yO_zX_t$, where "M" is a metal, "X" includes one or more halides and/or nitrate, x+y is from about 6.8 to about 7.2 (e.g., about 6.8, about 7.0, about 7.2), and z and t are selected to give the copper in $Cu_xM_yO_zX_t$ a formal oxidation state of +2 or greater. Metal "M" can be a transition metal (e.g., scandium, yttrium, niobium), a lanthanide (e.g., erbium, ytterbium), or a main group metal (e.g., indium, gallium, arsenic, bismuth, calcium). "X" can include chlorine, fluorine, bromine, iodine, nitrate, or a combination of one or more halides and/or nitrate. The formal oxidation state of the copper in $Cu_xM_yO_zX_t$ can be greater than +2 (e.g., +2.33). In some embodiments, the copper in $Cu_xM_yO_zX_t$ can have a formal oxidation state of +2.w, in which +2.w is from +2.0 to +2.4 (e.g. from +2.2 to +2.4, e.g. +2.3).

In certain embodiments, $Cu_xM_yO_zX_t$ is $Cu_xM_yO_zCl_t$. For example, $Cu_xM_yO_zX_t$), can be $Cu_6InO_8Cl$. The cathode active material can include multiple metals (e.g., $Cu_x(In,Ga)_yO_zX_t$), and/or a combination of a halide and nitrate (e.g., $Cu_xM_yO_z(Cl,(NO_3))_t$) and/or a combination of multiple halides and nitrate (e.g., $Cu_xM_yO_z(Cl,F,(NO_3))_t$).

In some embodiments, the cathode active material of cathode 12 includes from about 0.1 percent by weight to about 100 percent by weight $Cu_xM_yO_zX_t$. For example, the cathode active material can include more than about 0.1 percent by weight (e.g., more than about 0.2 percent by weight, more than about 0.5 percent by weight, more than about one percent by weight, more than about two percent by weight, more than about five percent by weight, more than about ten percent by weight, more than about 15 percent by weight, more than about 20 percent by weight, more than about 25 percent by weight, more than about 30 percent by weight, more than about 35 percent by weight, more than about 40 percent by weight, more than about 45 percent by weight, more than about 50 percent by weight, more than about 55 percent by weight, more than about 60 percent by weight, more than about 65 percent by weight, more than about 70 percent by weight, more than about 75 percent by weight, more than about 80 percent by weight, more than about 85 percent by weight, more than about 90 percent by weight, more than about 95 percent by weight, more than about 99 percent by weight, more than about 99.9 percent by weight) $Cu_xM_yO_zX_t$. Alternatively or additionally, the cathode active material of cathode 12 can include less than about 100 percent by weight (e.g., less than about 99.9 percent by weight, less than about 99 percent by weight, less than about 95 percent by weight, less than about 90 percent by weight, less than about 85 percent by weight, less than about 80 percent by weight, less than about 75 percent by weight, less than about 70 percent by weight, less than about 65 percent by weight, less than about 60 percent by weight, less than about 55 percent by weight, less than about 50 percent by weight, less than about 45 percent by weight, less than about 40 percent by weight, less than about 35 percent by weight, less than about 30 percent by weight, less than about 25 percent by weight, less than about 20 percent by weight, less than about 15 percent by weight, less than about ten percent by weight, less than about five percent by weight, less than about two percent by weight, less than about one percent by weight, less than about 0.5 percent by weight, less than about 0.2 percent by weight) $Cu_xM_yO_zX_t$. In embodiments in which the cathode active material includes less than about 100 percent by weight $Cu_xM_yO_zX_t$, the balance of the cathode active material can include at least one other type of cathode active material (other than $Cu_xM_yO_zX_t$). As an example, the cathode active material of cathode 12 can include about ten percent by weight $Cu_xM_yO_zX_t$ and about 90 percent by weight CuO.

In addition to including $Cu_xM_yO_zX_t$ and, in some embodiments, at least one other cathode active material, cathode 12 includes a conductive aid and a binder.

The conductive aid can increase the electronic conductivity of cathode 12. An example of a conductive aid is graphite (e.g., graphite particles). In some embodiments, cathode 12 includes less than about ten percent by weight (e.g., less than about nine percent by weight, less than about five percent by weight, less than about two percent by weight, less than about one percent by weight) and/or more than about 0.1 percent by weight (e.g., more than about 0.2 percent by weight, more than about 0.5 percent by weight, more than about 0.8 percent by weight, more than about 0.9 percent by weight) graphite. Graphite particles that are used in cathode 12 can be any of the graphite particles used in cathodes. The particles can be synthetic or nonsynthetic, and they can be expanded or nonexpanded. In certain embodiments, the graphite particles are nonsynthetic, nonexpanded graphite particles. In these embodiments, the graphite particles can have an average particle size of less than about 20 microns (e.g., from about two microns to about 12 microns, from about five microns to about nine microns), as measured using a Sympatec HELIOS analyzer. Nonsynthetic, nonexpanded graphite particles can be obtained from, for example, Brazilian Nacional de Grafite (Itapecirica, MG Brazil (MP-0702×)).

Another example of a conductive aid is carbon fibers, such as those described in commonly assigned U.S. Ser. No. 09/658,042, filed on Sep. 7, 2000, and entitled "Battery Cathode"; and in U.S. Published Patent Application No. U.S. 2002/0172867 A1, published on Nov. 21, 2002, and entitled "Battery Cathode", both of which are hereby incorporated by reference. In some embodiments, cathode 12 can include less than about two percent by weight (e.g., less than about 1.5 percent by weight, less than about one percent by weight, less than about 0.75 percent by weight, less than about 0.5 percent by weight) and/or more than about 0.1 percent by weight (e.g., more than about 0.2 percent by weight, more than about 0.3 percent by weight, more than about 0.4 percent by weight, more than about 0.45 percent by weight) carbon fibers.

In some embodiments, cathode 12 includes from about one percent by weight to about ten percent by weight of one or more total conductive aids.

Examples of binders include polyethylene powders, polyacrylamides, Portland cement and fluorocarbon resins, such as polyvinylidenefluoride (PVDF) and polytetrafluoroethylene (PTFE). An example of a polyethylene binder is sold under the trade name Coathylene HA-1681 (available from Hoechst). Cathode 12 may include, for example, from about 0.1 percent to about one percent of binder by weight.

In embodiments in which cathode 12 includes $Cu_xM_yO_zX_t$ as its only cathode active material, cathode 12 can be prepared by disposing (e.g., painting, spraying) $Cu_xM_yO_zX_t$ on another material or materials. For example, $Cu_xM_yO_zX_t$ can be disposed on an insulating substrate and/or an electronically conductive substrate. Examples of insulating substrates include glass beads, ceramic pellets, and porous zeolites. Examples of electronically conductive substrates include copper metal and graphite.

In embodiments in which cathode 12 includes $Cu_xM_yO_zX_t$ and at least one other cathode active material, cathode 12 can be prepared by directly mixing $Cu_xM_yO_zX_t$ with the other cathode active material(s) (e.g., a copper oxide). In other embodiments, cathode 12 can be prepared by including the other cathode active material(s) in a blend with $Cu_xM_yO_zX_t$, in which the other cathode active material(s) can serve as a composite structure or structures. In certain embodiments, $Cu_xM_yO_zX_t$ can be supported on another material or materials, such as an insulating substrate (e.g., glass beads, ceramic pellets, porous zeolites), an electrochemically active substrate (e.g., CuO), and/or an electronically conductive substrate (e.g., copper metal, graphite). For example, $Cu_xM_yO_zX_t$ can be coated on a copper oxide material. In some embodiments, $Cu_xM_yO_zX_t$ can be applied to a copper oxide using sol-gel techniques and/or precipitation of $Cu_xM_yO_zX_t$ from a solution.

As noted above, in certain embodiments, cathode 12 can include both $Cu_xM_yO_zX_t$ and at least one other cathode active material. Examples of other cathode active materials include copper oxides (e.g., cupric oxide (CuO), cuprous oxide ($Cu_2O$)); copper hydroxides (e.g., cupric hydroxide ($Cu(OH)_2$), cuprous hydroxide (Cu(OH))); cupric iodate ($Cu(IO_3)_2$); $AgCuO_2$; $LiCuO_2$; $Cu(OH)(IO_3)$; $Cu_2H(IO_6)$; copper-containing metal oxides or chalcogenides; copper halides (e.g., $CuCl_2$); and/or copper manganese oxides (e.g., $Cu(MnO_4)_2$). The copper oxides can be stoichiometric (e.g., CuO) or non-stoichiometric (e.g., $CuO_x$, where $0.5 \leq x \leq 1.5$). In some embodiments, cathode 12 can include, in addition to $Cu_xM_yO_zX_t$, from about 0.1 percent to about 99.9 percent, preferably from about 30 percent to about 50 percent, and more preferably from about five percent to about ten percent, of one or more other copper active materials by weight. All weight percentages provided herein that refer to the cathode composition are determined after the electrolyte has been dispersed. Weight percentages that refer to only the cathode active materials (and that are not relative to the overall cathode composition) are determined before the electrolyte has been dispersed.

While copper materials have been described, cathode 12 need not include only copper materials. For example, cathode 12 can include any material that exhibits low solubility (e.g., from about $10^{-6}$ moles/liter to about $10^{-1}$ mole/liter) in the system of which it is a part. A soluble cathode material or additive can lower cell performance and shelf life because dissolved ions originating from the cathode material or additive can migrate into the anode and cause premature cell failure. In some embodiments, cathode 12 can include a manganese oxide (e.g., $MnO_2$, such as EMD); a silver compound (e.g., $Ag_2O$, AgO); a permanganate (e.g., $Ba(MnO_4)_2$, $AgMnO_4$); nickel oxide; cobalt oxide; and/or nickel oxyhydroxide (NiOOH).

In some embodiments, cathode 12 can include relatively soluble active material, such as $KMnO_4$ and/or a ferrate (e.g., $K_2FeO_4$, $BaFeO_4$). In such embodiments, detrimental interaction between the soluble active material and the cell anode can be limited by the use of a selective and/or ion-trapping separator. Separators are described in, for example, U.S. patent application Ser. No. 10/682,740, entitled "Battery Separator" and filed on Oct. 9, 2003, which is hereby incorporated by reference. In certain embodiments, detrimental interaction between the soluble active material and the cell anode can be limited by structuring the cell to have a reserve cell configuration (e.g., structuring the cell to be sea-water activated). Reserve cells are described in, for example, David Linden, Handbook of Batteries (McGraw-Hill, 2d ed. 1995), Section III, Ch. 6, which is hereby incorporated by reference. In some embodiments, detrimental interaction between the soluble active material and the cell anode can be limited by adding a material (e.g., a chromate, a permanganate) to the cell that can interact with the cell anode to form a temporary protective film over the anode. The temporary film can protect the anode until the cell becomes electrochemically active.

Cathode 12 can have a relatively high Coulombic capacity. For example, in some embodiments, cathode 12 can have a Coulombic capacity of more than about 250 mAh/gram (e.g., more than about 275 mAh/gram, more than about 300 mAh/gram, more than about 325 mAh/gram, more than about 350 mAh/gram) and/or less than about 610 mAh/gram (e.g., less than about 600 mAh/gram, less than about 500 mAh/gram, less than about 450 mAh/gram, less than about 400 mAh/gram). The Coulombic capacity of a cathode can be measured by effecting a low-rate discharge in a flooded cell, such as that described in Karl V. Kordesch, *Batteries, Vol. 1 Manganese Dioxide*, (Marcel Dekker, Inc.: New York, 1974), p. 390, FIG. 3.

Alternatively or additionally, the cathode active material in cathode 12 can have a relatively high conductivity. For example, in some embodiments, the cathode active material can have a conductivity of more than about $10^{-2}$ $Ohm^{-1}$ cm$^{-1}$ (e.g., more than about 5×10$^{-1}$ Ohm$^{-1}$cm$^{-1}$, more than about 10$^{-1}$ Ohm$^{-1}$ cm$^{-1}$, more than about 5×10$^{-1}$ Ohm$^{-1}$ cm$^{-1}$, more than about one Ohm$^{-1}$ cm$^{-1}$, more than about ten Ohm$^{-1}$ cm$^{-1}$, more than about 100 Ohm$^{-1}$ cm$^{-1}$, more than about 200 Ohm$^{-1}$ cm$^{-1}$, more than about 300 Ohm$^{-1}$ cm$^{-1}$, more than about 400 Ohm$^{-1}$ cm$^{-1}$, more than about 500 Ohm$^{-1}$ cm$^{-1}$, more than about 600 Ohm$^{-1}$ cm$^{-1}$, more than about 700 Ohm$^{-1}$cm$^{-1}$, more than about 800 Ohm$^{-1}$ cm$^{-1}$, more than about 900 Ohm$^{-1}$ cm$^{-1}$) and/or less than about 1,000 Ohm$^{-1}$ cm$^{-1}$ (e.g., less than about 900 Ohm$^{-1}$ cm$^{-1}$, less than about 800 Ohm$^{-1}$ cm$^{-1}$, less than about 700 Ohm$^{-1}$ cm$^{-1}$, less than about 600 Ohm$^{-1}$ cm$^{-1}$, less than about 500 Ohm$^{-1}$ cm$^{-1}$, less than about 400 Ohm$^{-1}$ cm$^{-1}$, less than about 300 Ohm$^{-1}$ cm$^{-1}$, less than about 200 Ohm$^{-1}$ cm$^{-1}$, less than about 100 Ohm$^{-1}$ cm$^{-1}$, less than about ten Ohm$^{-1}$ cm$^{-1}$). The conductivity of cathode active material can be measured by a 4-probe test method applied to the cathode active material while it is held under pressure.

Anode 14 can be formed of any of the zinc materials used in battery anodes. For example, anode 14 can be a zinc gel that includes zinc metal particles, a gelling agent, and minor amounts of additives, such as gassing inhibitor. In addition, a portion of the electrolyte is dispersed throughout the anode.

The zinc particles can be any of the zinc particles used in gel anodes. Examples of zinc particles include those described in U.S. Pat. No. 6,284,410 and in U.S. Pat. No. 6,521,378, both of which are hereby incorporated by reference. The zinc particles can be a zinc alloy, e.g., containing a few hundred parts per million of indium and bismuth. Anode 14 may include, for example, between 67 percent and 80 percent of zinc particles by weight.

Examples of gelling agents include polyacrylic acids, grafted starch materials, salts of polyacrylic acids, polyacrylates, carboxymethylcellulose or combinations thereof. Examples of such polyacrylic acids are Carbopol 940 and 934 (available from Noveon Inc.) and Polygel 4P (available from 3V). An example of a grafted starch material is Waterlock A221 (available from Grain Processing Corporation, Muscatine, Iowa). An example of a salt of a polyacrylic acid is Alcosorb G1 (available from Ciba Specialties). Anode 14 may include, for example, from about 0.1 percent to about one percent gelling agent by weight.

Gassing inhibitors can be inorganic materials, such as bismuth, tin, lead and indium. Alternatively, gassing inhibitors can be organic compounds, such as phosphate esters, ionic surfactants or nonionic surfactants. Examples of ionic surfactants are disclosed in, for example, U.S. Pat. No. 4,777,100, which is hereby incorporated by reference.

Anode 14 can include other materials. For example, in some embodiments, anode 14 can include metals capable of reducing a cathode containing a copper material. Suitable metals include, e.g., aluminum, magnesium, calcium, silicon, boron, titanium, zirconium, hafnium, lanthanum, manganese, iron, cobalt, chromium, tantalum, and niobium. Binary, ternary, quaternary and other multi-component alloy combinations of these metals, and also those combinations including zinc with these metals, can be used.

The electrolyte can be any of the electrolytes used in batteries. The electrolyte can be aqueous or non-aqueous. An aqueous electrolyte can be an alkaline solution, such as an aqueous hydroxide solution, e.g., LiOH, NaOH, KOH, or a mixture of hydroxide solutions (e.g., NaOH/KOH). For example, the aqueous hydroxide solution can include from about 33 percent by weight to about 40 percent by weight of the hydroxide material, such as about 9 N KOH (about 37 percent by weight KOH). In some embodiments, the electrolyte can also include up to about four percent by weight (e.g., about two percent by weight) of zinc oxide.

In some embodiments, the electrolyte can be an aqueous salt solution such as ZnCl$_2$, NH$_4$Cl, or a mixture of ZnCl$_2$ and NH$_4$Cl. Other aqueous salt solutions include ZnSO$_4$, Zn(ClO$_4$)$_2$, MgBr$_2$, Mg(ClO$_4$)$_2$, and seawater.

The electrolyte can include other additives. As an example, the electrolyte can include a soluble material (e.g., an aluminum material) that reduces (e.g., suppresses) the solubility of the cathode active material in the electrolyte. In some embodiments, the electrolyte can include one or more of the following: aluminum hydroxide, aluminum oxide, alkali metal aluminates, aluminum metal, alkali metal halides, alkali metal carbonates, or mixtures thereof. Electrolyte additives are described in commonly assigned U.S. Ser. No. 10/382,941, filed on Mar. 6, 2003, and entitled "Battery", which is hereby incorporated by reference.

Housing 18 can be any housing commonly used in batteries, e.g., primary alkaline batteries. In some embodiments, housing 18 includes an inner metal wall and an outer electrically non-conductive material such as heat shrinkable plastic. Optionally, a layer of conductive material can be disposed between the inner wall and cathode 12. The layer may be disposed along the inner surface of the inner wall, along the circumference of cathode 12, or both. This conductive layer can be formed, for example, of a carbonaceous material. Such materials include LB1000 (Timcal), Eccocoat 257 (W.R. Grace & Co.), Electrodag 109 (Acheson Colloids Co.), Electrodag 112 (Acheson) and EB0005 (Acheson). Methods of applying the conductive layer are disclosed in, for example, Canadian Patent No. 1,263,697, which is hereby incorporated by reference.

Current collector 20 can be made from a suitable metal, such as brass. Seal 22 can be made, for example, of nylon.

Battery 10 can be assembled using conventional methods. In some embodiments, cathode 12 can be formed by a pack and drill method, described in U.S. Ser. No. 09/645,632, filed on Aug. 24, 2000, and entitled "Battery Cathode", which is hereby incorporated by reference.

In some embodiments, battery 10 can include a hydrogen recombination catalyst to lower the amount of hydrogen gas in the cell, which can be generated, for example, when traces of copper metal are plated onto the anode, causing the rate of hydrogen gassing from the zinc anode to increase. Suitable hydrogen recombination catalysts are described, e.g., in U.S. Pat. Nos. 6,500,576, and 3,893,870. Alternatively or in addition, battery 10 can be constructed to include pressure-activated valves or vents, as described, e.g., in U.S. Pat. No. 5,300,371.

In some embodiments in which cathode 12 includes both Cu$_x$M$_y$O$_z$X$_t$ and at least one other cathode active material, battery 10 can be hermetically sealed such that battery 10 is a closed system. As a comparison, metal air cells and fuel cells are open systems.

In certain embodiments, the cathode active material includes (Cu$_{1-x}$M'$_x$)M$_y$O$_z$X$_t$, where "M'" and "M" are metals, "X" includes one or more halides and/or nitrate, x+y is from about 6.8 to about 7.2, and z and t are selected to give the copper in (Cu$_{1-x}$M'$_x$)M$_y$O$_z$X$_t$ a formal oxidation state of +2 or greater. Examples of metal "M'" include nickel, iron, cobalt, and manganese. Metal "M" can be a transition metal (e.g., scandium, yttrium, niobium), a lanthanide (e.g., erbium, ytterbium), or a main group metal (e.g., indium, gallium, arsenic, bismuth, calcium). "X" can include chlorine, fluorine, bromine, iodine, nitrate, or a combination of one or more halides and/or nitrate.

Battery 10 can be, for example, a AA, AAA, AAAA, C, or D battery. In other embodiments, battery 10 can be non-cylindrical, such as coin cell, button cells, prismatic cells, wafer cells, or racetrack-shaped cells. Battery 10 can include a multi-lobed electrode, as described in U.S. Pat. No. 6,342,317, which is hereby incorporated by reference.

Battery 10 can be a primary electrochemical cell or a secondary electrochemical cell. Primary cells are meant to be discharged, e.g., to exhaustion, only once, and then discarded. Primary cells are not intended to be recharged. Primary cells are described, for example, in David Linden, Handbook of Batteries (McGraw-Hill, 2d ed. 1995), incorporated above. Secondary electrochemical cells can be recharged for many times, e.g., more than fifty times, more than a hundred times, or more. In some embodiments, secondary cells can include relatively robust separators, such as separators that have many layers and/or separators that are relatively thick. Secondary cells can also be designed to accommodate for changes, such as swelling, that can occur in the cells. Secondary cells are described, e.g., in Falk & Salkind, "Alkaline Storage Batteries", John Wiley & Sons, Inc. 1969; U.S. Pat. No. 345,124; and French Patent No. 164,681, all hereby incorporated by reference.

A battery that includes cathode 12 can have a relatively high closed circuit voltage. For example, the battery can have a closed circuit voltage of more than about 1.1 Volts (e.g., more than about 1.15 Volts, more than about 1.2 Volts, more than about 1.25 Volts, more than about 1.3 Volts) and/or less than about 1.8 Volts (e.g., less than about 1.7 Volts, less than about 1.6 Volts, less than about 1.5 Volts, less than about 1.4 Volts). The closed circuit voltage of a battery can be measured by, for example, applying a six-ampere constant current load to the battery for 0.1 seconds and measuring the voltage of the battery.

A battery that includes cathode 12 can have a relatively high open circuit voltage. For example, the battery can have an open circuit voltage of more than about one Volt (e.g., more than about 1.1 Volts, more than about 1.2 Volts, more than about 1.3 Volts, more than about 1.4 Volts, more than about 1.45 Volts, more than about 1.5 Volts, more than about 1.6 Volts, more than about 1.7 Volts, more than about 1.8 Volts) and/or less than about 1.9 Volts (e.g., less than about 1.8 Volts, less than about 1.7 Volts, less than about 1.6 Volts, less than about 1.5 Volts, less than about 1.45 Volts, less than about 1.4 Volts, less than about 1.3 Volts, less than about 1.2 Volts, less than about 1.1 Volts). The open circuit voltage of a battery can be measured by, for example, a high impedance Voltmeter, with an input impedance of greater than ten MegOhms, so that there is virtually no load on the battery during the test.

The following examples are illustrative, and are not intended to be limiting.

EXAMPLES

Preparation of $Cu_6InO_8Cl$

Example 1

A $Cu_6InO_8Cl$ cathode active material was prepared as follows, based on a method described in Sugise et al., U.S. Pat. No. 5,112,783.

First, 8.07 grams of $In(NO_3)_2 \cdot H_2O$, 4.31 grams of $CuCl_2 \cdot 2H_2O$, and 36.4 grams of $Cu(NO_3)_2 \cdot 3H_2O$ were dissolved in about 25 milliliters of deionized water. The resulting solution was slowly dried in an alumina crucible over a hot plate at about 150° C. The dried material was then placed in a furnace and heated in air at 250° C. for 40 minutes. The resulting material was ground and heated at 425° C. for an additional ten minutes. Finally, the product was reground and heated at 500° C. for 30 minutes.

Example 2

A $Cu_6InO_8Cl$ cathode active material was prepared as follows, based on a modification of a synthesis described in Paranthaman, M. and Steinfink, H., *J. Solid State Chem.* 1992, 96, 243–246.

Indium metal (2.296 grams), $CuCl_2 \cdot 2H_2O$ (3.41 grams), and $Cu(NO_3)_2 \cdot 2.5H_2O$ (24.19 grams) were dissolved in 100 milliliters of dilute nitric acid. The solution was evaporated to dryness. The resulting dry material was then inserted into a preheated furnace at 500° C. for ten minutes, air cooled, and ground. At the final stage, the ground material was reheated at 500° C. for an additional two hours and air cooled.

Analysis of the Example 2 $Cu_6InO_8Cl$ cathode active material by powder x-ray diffraction (XRD) revealed the presence of cubic $Cu_6InO_8Cl$ as a major phase. Further analysis of the $Cu_6InO_8Cl$ cathode active material by scanning electron microscopy/energy dispersive spectroscopy (SEM/EDS) confirmed that the ratio of copper to indium was approximately six.

Figure 2A:
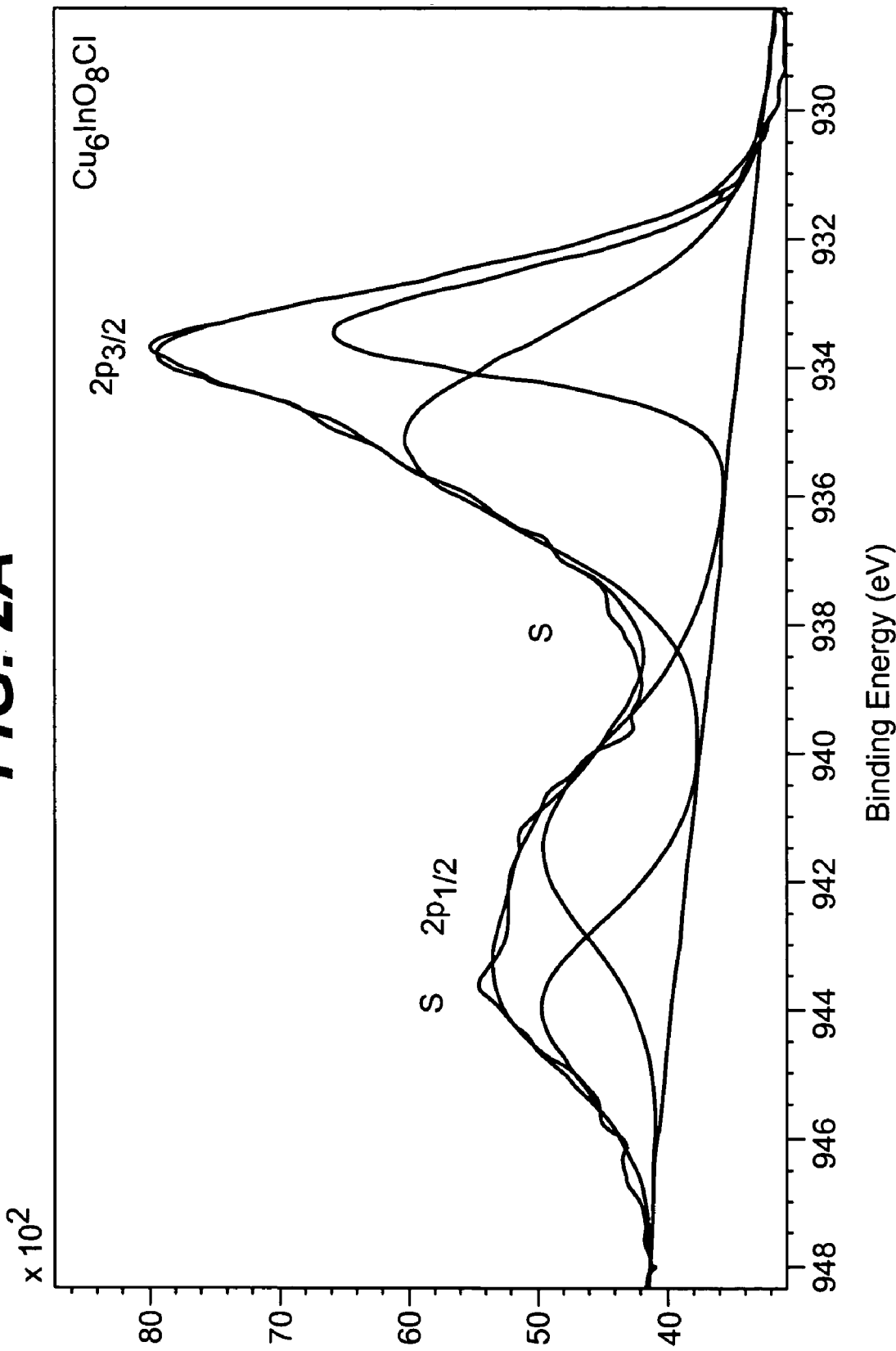
FIG. 2A is a portion of an x-ray photoelectron spectrum for $Cu_6O_8InCl$.

Referring to FIG. 2A, surface analysis of the $Cu_6InO_8Cl$ cathode active material by x-ray photoelectron spectroscopy (XPS) indicated a copper oxidation state higher than +2. The breadth of the $2p_{3/2}$ peak for $Cu_6InO_8Cl$ (FIG. 2A), compared to the breadth of the $2p_{3/2}$ peak for CuO (FIG. 2), was indicative of a high valent copper oxidation state (>+2) for $Cu_6InO_8Cl$.

The true density of the $Cu_6InO_8Cl$ cathode active material was measured with a pycnometer under helium atmosphere, and was about 5.43 g/cm$^3$. The resistivity of powder samples of the $Cu_6InO_8Cl$ was measured under pressure using a four-probe method, and was about $5 \times 10^{-3}$ Ohm-cm.

Flooded Cell Measurements of $Cu_6InO_8Cl$

FIGS. 3–6 show the electrochemical performance of the Example 2 $Cu_6InO_8Cl$ cathode active material in a flooded cell. By "flooded" it is meant that the $Cu_6InO_8Cl$ was disposed in an excess of electrolyte while its electrochemical performance was measured. The electrochemical performance of the $Cu_6InO_8Cl$ was measured under both potentiodynamic conditions (FIG. 3), in which the voltage applied to the $Cu_6InO_8Cl$ was swept or stepped linearly with time in the negative direction, and galvanostatic conditions (FIGS. 4–6), in which the current applied to the $Cu_6InO_8Cl$ was constant.

First, measurements of the electrochemical performance of the $Cu_6InO_8Cl$ and of the CuO were taken under potentiodynamic conditions in a flooded cell. Electrochemical characterization of $Cu_6InO_8Cl$ and of CuO was performed in a three electrode double H-glass cell, which included a Hg/HgO reference electrode and a platinum auxiliary electrode. The three-electrode cell also included a working electrode that was prepared by pressing a mixture of 50 percent teflonized acetylene black (TAB) and 50 percent cathode active material mix (total weight=100±0.5 mg) onto a nickel x-met current collector using a pressure of one metric ton/cm$^2$. To enhance wetting, the working electrode was soaked in electrolyte (9N KOH) for 30 minutes prior to the electrochemical measurements. Voltages applied to the working electrode were stepped in the negative direction at 0.02 mV/second, and recorded against the Hg/HgO reference electrode. The recorded voltages were plotted versus the hypothetical zinc reference electrode voltage (assuming $Zn/Zn(OH)_4^{2-}$ as 1.37 V negative to Hg/HgO).

Figure 3:
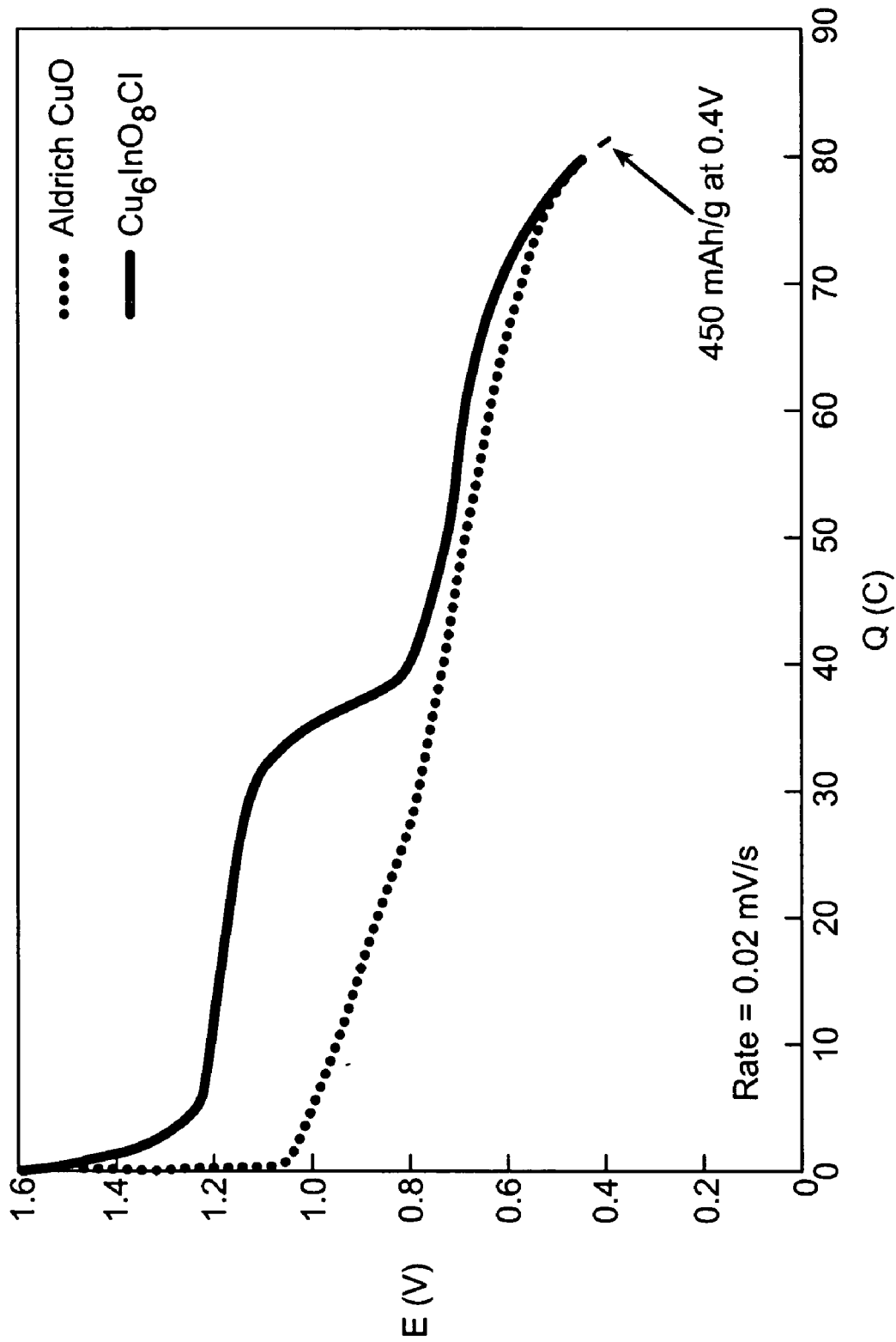
FIG. 3 is a graph illustrating discharge curves for CuO and $Cu_6O_8InCl$ electrodes, discharged potentiodynamically in a flooded cell at a constant scan rate of 0.02 mV/second.

FIG. 3 shows a comparison between the electrochemical performance of $Cu_6InO_8Cl$ and CuO under potentiodynamic conditions. When the electrochemical performance was being evaluated, the potential was shifted negatively from an open-circuit-potential (OCV) down to 0.400 V in steps of 0.02 mV/second. In FIG. 3, integrated voltammograms, corrected for the reference electrode voltage, show that the $Cu_6InO_8Cl$ had a higher OCV and higher CCV, down to a 0.6 V cut off-voltage, than a comparable electrode with CuO. Additionally, the $Cu_6InO_8Cl$ delivered as much capacity as the CuO, to a 0.6 V cut-off voltage. Furthermore, for the first 50 percent of the discharge, the $Cu_6InO_8Cl$ displayed a discharge voltage that was 200 mV higher than the discharge voltage of the CuO. The $Cu_6InO_8Cl$ also had a well-defined flat discharge behavior.

Next, the electrochemical performance of $Cu_6InO_8Cl$ was evaluated under constant current conditions.

Figure 4:
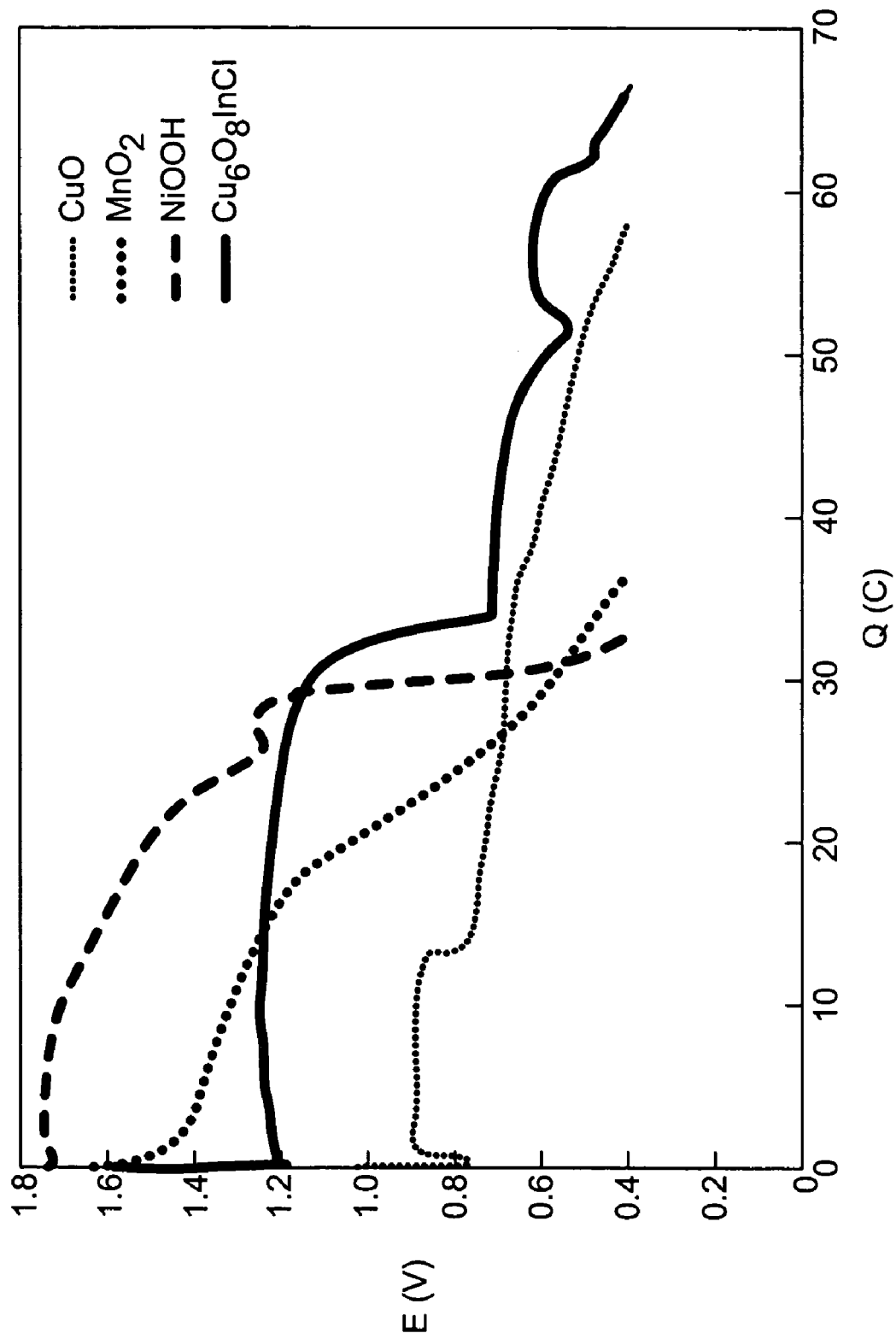
FIG. 4 is a graph illustrating discharge curves for $Cu_6O_8InCl$, CuO, $MnO_2$, and NiOOH, discharged galvanostatically in a flooded cell at a constant applied current of 110 mA/gram.

FIG. 4 shows the results of a 110 mA/gram high rate discharge test performed on CuO, $MnO_2$, NiOOH, and $Cu_6O_8InCl$ under constant current conditions in a flooded cell filled with 9N KOH solution. Reference electrode potentials were corrected to represent the polarization vs. a zinc metal electrode. Relative to commercially available alkaline cathode active materials (e.g., cobalt oxyhydroxide-coated β-NiOOH, available from Umicore; electrolytic manganese dioxide (EMD), available from Kerr-McGee), $Cu_6InO_8Cl$ showed a lower discharge voltage but twice the capacity, to a 0.6 V cut-off. As FIG. 4 shows, at high rate drains (110 mA/gram), the $Cu_6O_8InCl$ phase showed a good rate capability. In comparison to commercial alkaline $MnO_2$ and cobalt oxyhydroxide-coated β-NiOOH cathode materials, $Cu_6O_8InCl$ displayed a lower discharge potential but twice the capacity at a 0.6 V cut-off.

Figure 5:
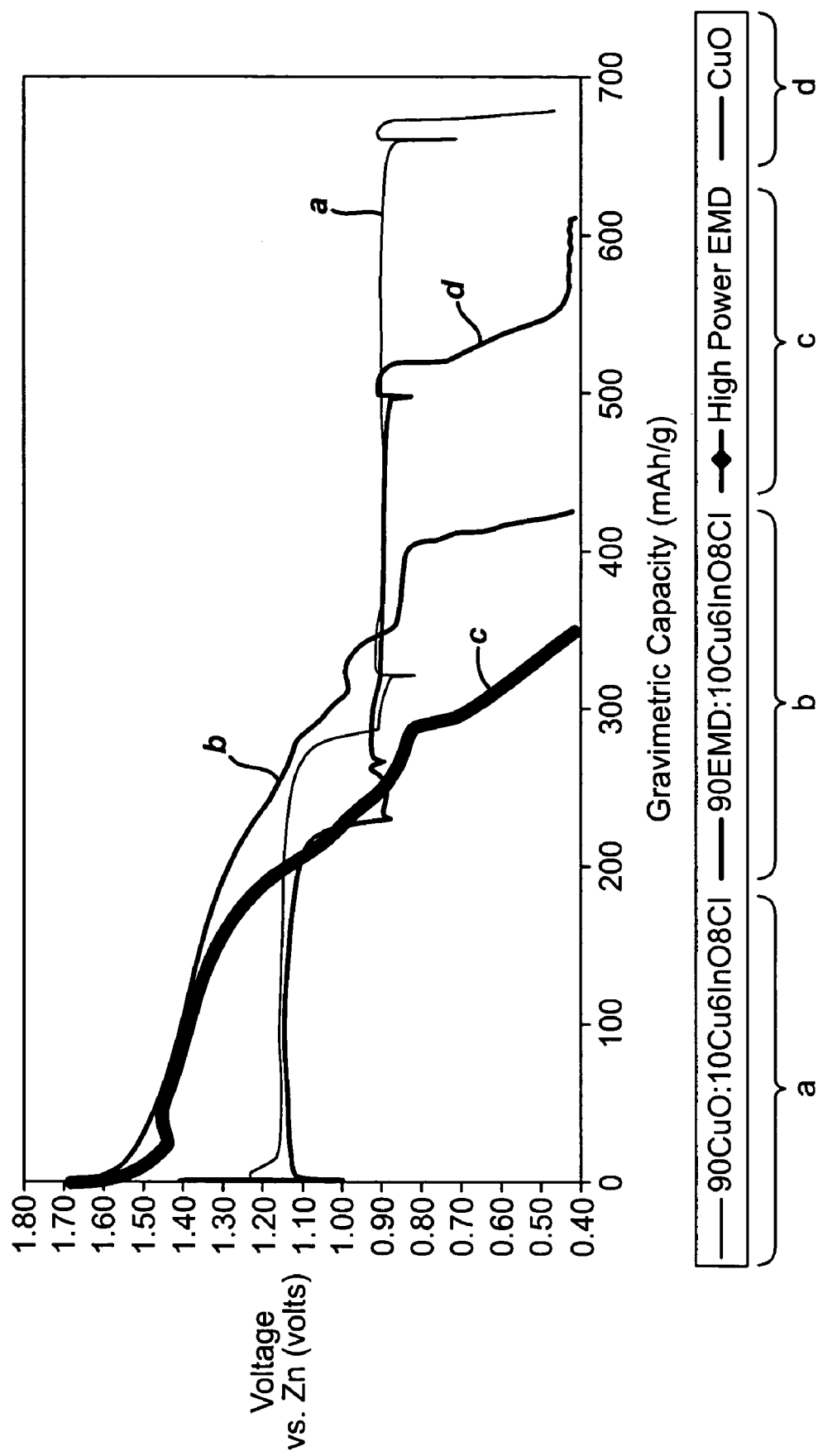
FIG. 5 is a graph illustrating discharge curves for high power electrolytic $MnO_2$ (curve c), CuO (curve d), a blend of 90 percent by weight electrolytic $MnO_2$ and ten percent by weight $Cu_6O_8InCl$ (curve b), and a blend of 90 percent by weight CuO and ten percent by weight $Cu_6O_8InCl$ (curve a), discharged galvanostatically in a flooded cell at a constant applied current of ten mA/gram.
Figure 6:
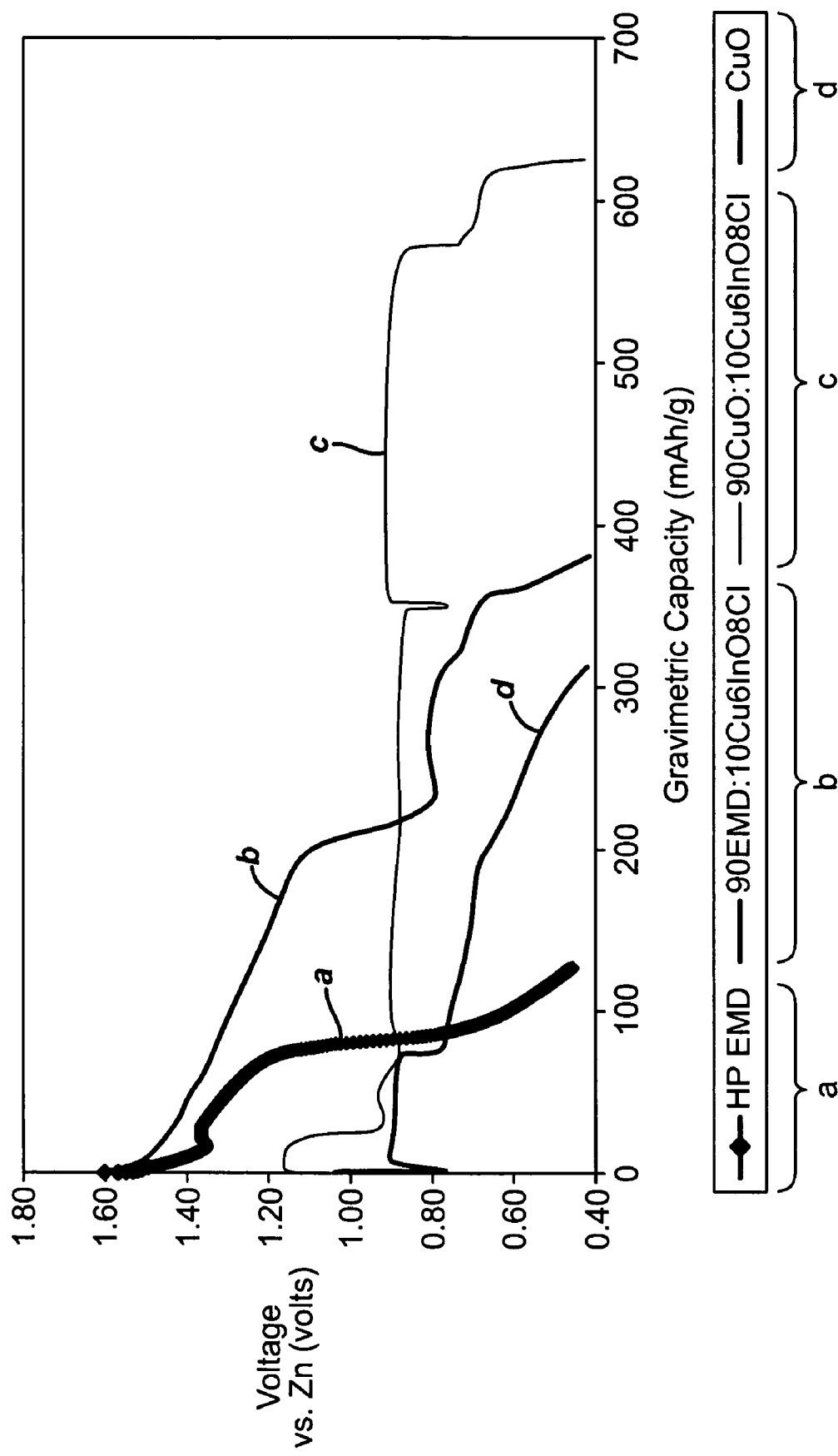
FIG. 6 is a graph illustrating discharge curves for high power electrolytic $MnO_2$ (curve a), CuO (curve d), a blend of 90 percent by weight electrolytic $MnO_2$ and ten percent by weight $Cu_6O_8InCl$ (curve b), and a blend of 90 percent by weight CuO and ten percent by weight $Cu_6O_8InCl$ (curve c), discharged galvanostatically in a flooded cell at a constant applied current of 110 mA/gram.

FIGS. 5 and 6 show the results of "low rate" and "high rate" measurements (taken under constant current conditions) of cathode blends that included $Cu_6InO_8Cl$ and CuO or electrolytic $MnO_2$ (EMD). Cathode blends containing ten percent by weight $Cu_6InO_8Cl$ and 90 percent by weight CuO or electrolytic $MnO_2$ were mixed with an equal amount of teflonized acetylene black (50/50). The working electrode was prepared as described above. Low rate (ten mA/gram) and high rate (110 mA/gram) discharge tests were performed in a flooded cell filled with 9N KOH solution. Reference electrode potentials were corrected to represent the polarization vs. a zinc metal electrode. The performance of the cathode blends was compared to the performance of high power electrolytic $MnO_2$ (HP EMD, from Kerr McGee) and CuO. As FIGS. 5 and 6 show, cathode blends including a minor amount of $Cu_6InO_8Cl$ displayed large improvements in the OCV, CCV, and discharge capacity of CuO and high power electrolytic $MnO_2$, at both high and low rate drains. A more than three-fold increase in discharge capacity to a 0.6 V cut-off voltage at a 110 mA/gram rate was obtained.

Thus, a small proportion (e.g. ten percent) of $Cu_6InO_8Cl$ substantially improved the electrochemical performance of CuO and electrolytic $MnO_2$, particularly at high rate drains. At a 0.6 V cut-off voltage, blends that included electrolytic $MnO_2$ or CuO and ten percent $Cu_6InO_8Cl$ displayed 360 mAh/gram and 620 mAh/gram discharge capacities, respectively. These discharge capacities were approximately three times higher than those of 100 percent electrolytic high power $MnO_2$ (100 mAh/gram) and 100 percent CuO (230 mAh/gram), at the same discharge rate of 110 mAh/gram.

"In Cell" Measurements of $Cu_6InO_8Cl$

In addition to the "flooded" discharge tests, a second type of test was run on "spring-loaded cells" that approximated coin cell configurations and that could maintain good contact by use of a constant pressure spring. The spring-loaded cells contained CuO or blends including $Cu_6InO_8Cl$.

The cells were constructed so as to approximate the construction of a AA cell, as described below:

Preparation of Cathode

The cathode blend included 95 percent by weight positive active material, 4.8 percent by weight expanded graphite (Timrex E-BNB90, from Timcal), and 0.2 percent by weight binder (Coathylene HA, 1681 Polyethylene Powder, from Hoechst).

A pressed cathode pellet was prepared from the cathode blend, and had the following dimensions: a thickness of 1.7 mm, a diameter of 17.8 mm, and a volume of 423 mm$^3$. The cathode had a weight of 1.4 grams.

The cathode pellet was soaked in 9N KOH electrolyte via vacuum back-filling, thereby absorbing about 0.2 grams of electrolyte.

Preparation of Anode

An anode pellet was formed by pressing about six grams of a 70 percent zinc slurry in a 17.8 mm die at 0.8 metric ton pressure, and pressing out a portion of the gelled electrolyte. The porous zinc pellet, retrieved after pressing out the excess electrolyte, was employed as the anode in the spring-loaded cell.

The starting composition of the zinc slurry (before pressing) was as follows: 35 percent by weight Duracell Enhanced Zinc Powder (containing 230 ppm bismuth, 150 ppm indium), 35 percent by weight Noranda grade P25 Fine Zinc Powder, 29.4 percent by weight 40/2 Electrolyte Solution (containing 34.7% KOH, 2.0% ZnO, balance water), 0.43 percent by weight Carbopol PAA 940 Gellant, 0.03 percent by weight Waterlock Gellant A221, 0.005 percent by weight (based on total slurry weight) RM 510 Organic Gassing Inhibitor, and 0.03 percent by weight (based on total slurry weight) chemically plated indium metal gassing inhibitor.

Separator

A three-layer separator was employed. The separator included an outer 23-micron cellophane layer and an outer 54-micron poly(vinyl alcohol)-based non-woven layer (PA25MC). The separator further included a third copper-trapping layer that was sandwiched between the two outer layers. The third copper-trapping layer included −325 mesh bismuth powder and a poly(acrylic acid) adhesive. The separator was sealed along its circumference with a Teflon-encapsulated O-ring. Thus, all electrolyte diffusion and migration between the cathode and the anode was forced to pass through the copper-trapping layer in order to minimize copper ion transfer from cathode to anode. Separators are further described in U.S. patent application Ser. No. 10/682,740, incorporated above.

Results

The cells were subjected to a series of short current pulses (from about ten milliamperes to about one ampere) of increasing intensity with a 15-minute rest (zero current) in between pulses. Closed Circuit Voltage (CCV) was then observed during the duration of the pulse and the CCV at the end of the pulse was plotted against the discharge intensity. Thus the ability of each material or blend of materials to support increasingly heavier discharge intensities was determined. A higher CCV indicated that the material could support a heavier discharge intensity.

Figure 7:
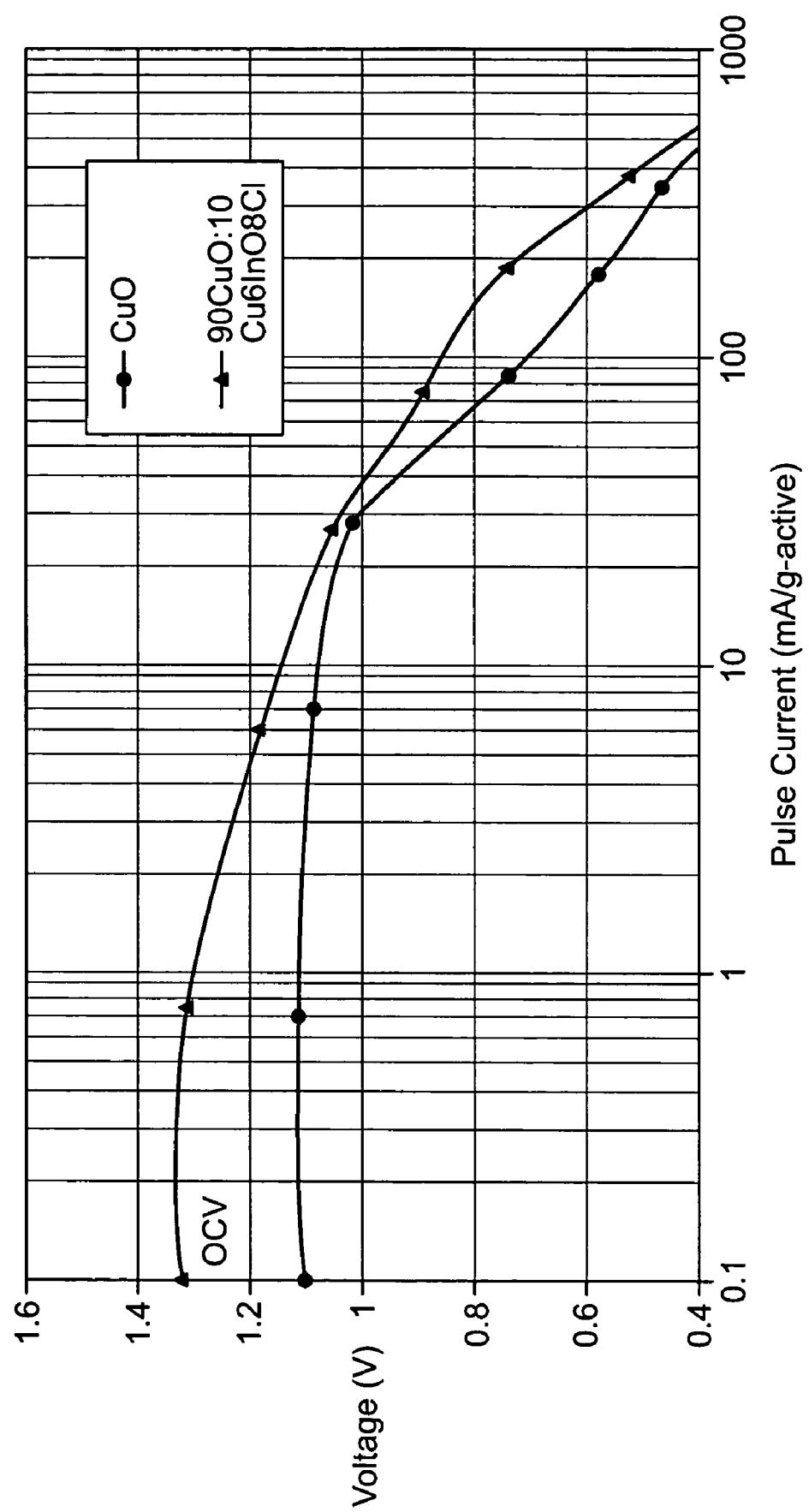
FIG. 7 is a graph illustrating pulse current versus load voltage for a cathode with 100 percent CuO cathode active material and a cathode with 90 percent CuO and ten percent $Cu_6InO_8Cl$ as cathode active material.

FIG. 7 shows the results from the "spring-loaded cell" tests. With the addition of ten 10 percent $Cu_6InO_8Cl$ to the cathode (the remaining 90 percent being CuO), CCV was consistently higher, at all levels of discharge intensity, relative to a cathode with 100 percent CuO cathode active material. At a typical cut-off voltage of 0.8 V, the $Cu_6InO_8Cl$ containing cell could support a 300 mA/gram active current, which was twice that of the cell that contained only CuO (i.e., that did not contain any $Cu_6InO_8Cl$).

Assembled AA Cell Measurements

A third type of test was run on fully assembled AA alkaline cells. These cells were constructed as follows:

Preparation of Cathode

The cathode included 89.3 percent by weight positive active material, 4.5 percent by weight graphite (NDG Grafmax MP12), six percent by weight 9N KOH electrolyte, and 0.2 percent by weight Coathylene HA-1681 Polyethylene Powder Binder.

Cathode pellets were prepared with the following dimensions: a height of 42.5 mm, an outer diameter of 13.3 mm, and an inner diameter of 9.9 mm. The cathode had a volume of 2660 mm$^3$, and a weight of 10.3 grams.

Preparation of Anode

The anode included 75 percent by weight zinc powder (containing 230 ppm bismuth, 150 ppm indium), 24 percent by weight electrolyte (40/2 KOH solution), 0.3 percent by weight Carbopol PAA 940, 0.02 percent by weight Waterlock Gellant A211, 0.005 percent by weight (based on total slurry weight) RM 510 Organic Gassing Inhibitor, and 0.03 percent by weight (based on total slurry weight) chemically plated indium metal gassing inhibitor. Furthermore, 0.6 gram of 9N KOH electrolyte preshot was added to the cathode prior to anode metering.

Separator

A Duralam 225 tube and disc separator was used. The tube was 40 mm high and had an outer diameter of 9.8 mm. The disc had a flattened total diameter of 15 mm and a cupped internal diameter of 9.8 mm. The sidewall height of the disc was 2.5 mm. The seams of the separator overlapped without sealing. There was no copper trapping layer used between the non-woven and cellophane layers of the Duralam separator.

Results

Figure 8:
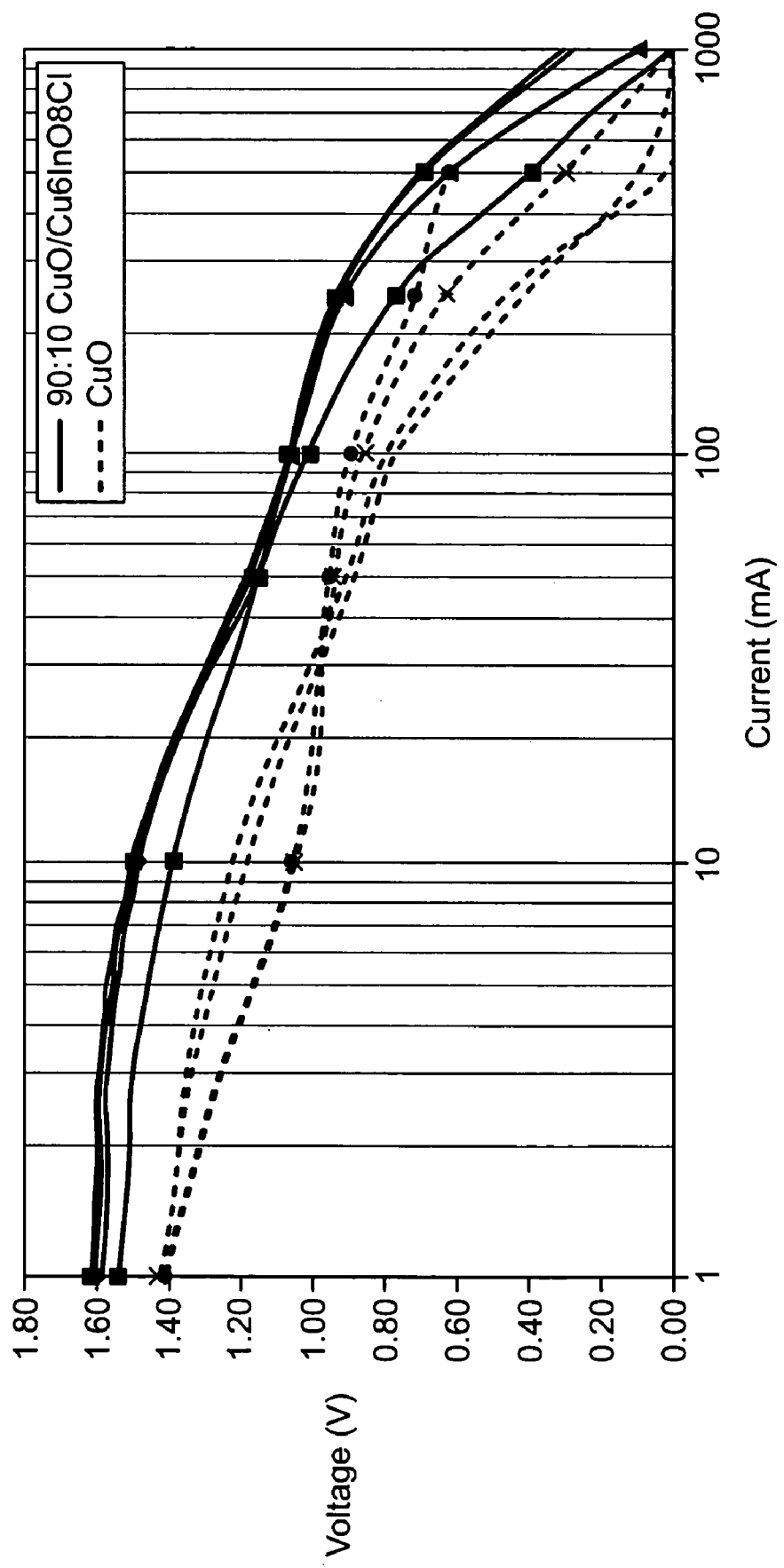
FIG. 8 is a graph illustrating polarization curves of fresh AA cells with cathodes that include CuO and a blend of 90 percent by weight CuO and ten percent by weight $Cu_6InO_8Cl$.

Fresh AA cells were evaluated by a signature test, which involved applying increments of current (from about 50 milliamperes to about one ampere) and measuring the response in voltages (FIG. 8). A fresh cell has not been subjected to any discharge other than the discharge that occurs during routine electrical inspection. As FIG. 8 shows, the AA cells containing CuO with a minor amount of $Cu_6InO_8Cl$ (ten percent by weight) were more rate capable than the cells containing 100 percent CuO as a cathode. The AA cells containing ten percent by weight $Cu_6InO_8Cl$ could sustain currents up to 500 mA, while the closed circuit voltage was measured as approximately 0.7 V. On the other hand, the AA cells with 100 percent CuO performed poorly at high drain rates, displaying a sharp drop in the cell voltages. Additionally, the cells with ten 10 percent by weight $Cu_6InO_8Cl$ showed higher OCV and CCV at low and high drain rates.

All references, such as patent applications, publications, and patents, referred to herein are incorporated by reference in their entirety.

Other embodiments are in the claims.

What is claimed is:

1. A battery, comprising:
    a housing;
    an anode within the housing;
    an electrolyte within the housing; and
    a cathode within the housing, the cathode including a cathode active material comprising less than about 40 percent by weight $Cu_xM_yO_zX_t$, wherein M is a metal, X includes one or more halides and/or nitrate, x+y is from about 6.8 to about 7.2, and z and t are selected so that the copper in $Cu_xM_yO_zX_t$ has a formal oxidation state of +2 or greater.

2. The battery of claim 1, wherein M is indium, gallium, arsenic, scandium, yttrium, bismuth, niobium, calcium, or a lanthanide.

3. The battery of claim 1, wherein M is indium.

4. The battery of claim 1, wherein X is chlorine.

5. The battery of claim 1, wherein $Cu_xM_yO_zX_t$ is $Cu_xIn_yO_zCl_t$.

6. The battery of claim 1, wherein $Cu_xM_yO_zX_t$ is $Cu_6InO_8Cl$.

7. The battery of claim 1, wherein the cathode active material comprises less than about 35 percent by weight $Cu_xM_yO_zX_t$.

8. The battery of claim 1, wherein the cathode active material comprises less than about 30 percent by weight $Cu_xM_yO_zX_t$.

9. The battery of claim 1, wherein the cathode active material comprises less than about 25 percent by weight $Cu_xM_yO_zX_t$.

10. The battery of claim 1, wherein the cathode active material comprises less than about 20 percent by weight $Cu_xM_yO_zX_t$.

11. The battery of claim 1, wherein the cathode active material comprises less than about 15 percent by weight $Cu_xM_yO_zX_t$.

12. The battery of claim 1, wherein the cathode active material comprises less than about ten percent by weight $Cu_xM_yO_zX_t$.

13. The battery of claim 1, wherein the cathode active material comprises less than about five percent by weight $Cu_xM_yO_zX_t$.

14. The battery of claim 1, wherein the cathode active material comprises less than about two percent by weight $Cu_xM_yO_zX_t$.

15. The battery of claim 1, wherein the cathode active material comprises less than about one percent by weight $Cu_xM_yO_zX_t$.

16. The battery of claim 1, wherein x+y is about 6.8.

17. The battery of claim 1, wherein x+y is about 7.2.

18. The battery of claim 1, wherein the copper in $Cu_xM_yO_z X_t$ has a formal oxidation state of +2.w and +2.w is from +2.0 to +2.4.

19. The battery of claim 1, wherein the copper in $Cu_xM_yO_z X_t$ has a formal oxidation state of +2.w and +2.w is from +2.2 to +2.4.

20. The battery of claim 1, wherein the cathode comprises less than about ten percent by weight graphite.

21. The battery of claim 1, wherein the cathode comprises less than about five percent by weight graphite.

22. The battery of claim 1, wherein the cathode comprises less than about two percent by weight carbon fibers.

23. The battery of claim 1, wherein the cathode comprises less than about 0.5 percent by weight carbon fibers.

24. The battery of claim 1, wherein the cathode active material further comprises a copper oxide, manganese dioxide, or nickel oxyhydroxide.

25. The battery of claim 1, wherein the cathode active material further comprises a copper oxide.

26. The battery of claim 25, wherein the copper oxide comprises CuO or $Cu_2O$.

27. The battery of claim 1, wherein the cathode active material comprises less than about 20 percent by weight $Cu_xM_yO_zX_t$ and more than about 80 percent by weight of a copper oxide, manganese dioxide, or nickel oxyhydroxide.

28. The battery of claim 1, wherein the cathode active material comprises less than about 20 percent by weight $Cu_xM_yO_zX_t$ and more than about 80 percent by weight of a copper oxide.

29. The battery of claim 1, wherein the cathode has a Coulombic capacity of more than about 260 mAh/gram.

30. The battery of claim 1, wherein the cathode has a Coulombic capacity of more than about 450 mAh/gram.

31. The battery of claim 1, wherein the cathode active material has a resistivity of less than about one Ohm-cm.

32. The battery of claim 1, wherein the cathode active material has a resistivity of less than about $10^{-2}$ Ohm-cm.

33. The battery of claim 1, wherein the battery has an open circuit voltage of more than about 1.2 Volts.

34. The battery of claim 1, wherein the battery has a open circuit voltage of more than about 1.5 Volts.

35. The battery of claim 1, wherein the battery has a closed circuit voltage of more than about 1.4 Volts on a load of one mA/gram of cathode active material.

36. The battery of claim 1, wherein the battery has a closed circuit voltage of more than about one Volt on a load of ten mA/gram of cathode active material.

37. The battery of claim 1, wherein the anode comprises zinc.

38. The battery of claim 1, wherein the electrolyte is an alkaline electrolyte.

39. A battery, comprising:
a housing;
an anode within the housing;
a cathode within the housing, the cathode including a first cathode active material and a second cathode active material comprising $Cu_xM_yO_zX_t$, wherein M is a metal, X includes one or more halides and/or nitrate, x+y is from about 6.8 to about 7.2, and z and t are selected so that the copper in $Cu_xM_yO_zX_t$ has a formal oxidation state of +2 or greater;
and an alkaline electrolyte,
wherein the battery is a primary battery.

40. The battery of claim 39, wherein the first cathode active material is CuO, $MnO_2$, or NiOOH.

41. The battery of claim 39, wherein the anode comprises zinc.

42. The battery of claim 39, wherein $Cu_xM_yO_zX_t$ is $Cu_xM_yO_zCl_t$.

43. The battery of claim 39, wherein $Cu_xM_yO_zX_t$ is $Cu_6InO_8Cl$.

44. A battery, comprising:
a housing;
an anode within the housing;
an alkaline electrolyte within the housing; and
a cathode within the housing, the cathode including a cathode active material comprising $Cu_xM_yO_zX_t$, wherein M is a metal, X includes one or more halides and/or nitrate, x+y is from about 6.8 to about 7.2, and z and t are selected so that the copper in $Cu_xM_yO_zX_t$ has a formal oxidation state of +2 or greater,
wherein the battery is a closed system.

45. The battery of claim 44, wherein M is indium, gallium, arsenic, scandium, yttrium, bismuth, niobium, calcium, or a lanthanide.

46. The battery of claim 44, wherein M is indium.

47. The battery of claim 44, wherein X is chlorine.

48. The battery of claim 44, wherein $Cu_xM_yO_zX_t$ is $Cu_xIn_yO_zCl_t$.

49. The battery of claim 44, wherein $Cu_xM_yO_zX_t$ is $Cu_6InO_8Cl$.

50. The battery of claim 44, wherein the cathode active material comprises more than about 70 percent by weight $Cu_xM_yO_zX_t$.

51. The battery of claim 44, wherein the cathode active material comprises more than about 80 percent by weight $Cu_xM_yO_zX_t$.

52. The battery of claim 44, wherein the cathode active material comprises more than about 90 percent by weight $Cu_xM_yO_zX_t$.

53. The battery of claim 44, wherein the cathode active material comprises more than about 95 percent by weight $Cu_xM_yO_zX_t$.

54. The battery of claim 44, wherein the cathode active material comprises more than about 99 percent by weight $Cu_xM_yO_zX_t$.

55. The battery of claim 44, wherein x+y is about 6.8.

56. The battery of claim 44, wherein x+y is about 7.2.

57. The battery of claim 44, wherein the copper in $Cu_xM_yO_zX_t$ has a formal oxidation state of +2.w and +2.w is from +2.0 to +2.4.

58. The battery of claim 44, wherein the copper in $Cu_xM_yO_zX_t$ has a formal oxidation state of +2.w and +2.w is from +2.2 to +2.4.

59. The battery of claim 44, wherein the battery has an open circuit voltage of more than about 1.2 Volts.

60. The battery of claim 44, wherein the battery has an open circuit voltage of more than about 1.5 Volts.

61. The battery of claim 44, wherein the battery has a closed circuit voltage of more than about 1.4 Volts on a load of one mA/gram of cathode active material.

62. The battery of claim 44, wherein the battery has a closed circuit voltage of more than about one Volt on a load of ten mA/gram of cathode active material.

63. The battery of claim 44, wherein the anode comprises zinc.

64. A cathode including a cathode active material comprising less than about 40 percent by weight $Cu_xM_yO_zX_t$, wherein M is a metal, X includes one or more halides and/or nitrate, x+y is from about 6.8 to about 7.2, and z and t are selected so that the copper in $Cu_xM_yO_zX_t$ has a formal oxidation state of +2 or greater.

65. The cathode of claim 64, wherein M is indium, gallium, arsenic, scandium, yttrium, bismuth, niobium, calcium, or a lanthanide.

66. The cathode of claim 64, wherein M is indium.

67. The cathode of claim 64, wherein X is chlorine.

68. The cathode of claim 64, wherein $Cu_xM_yO_zX_t$ is $Cu_xIn_yO_zCl_t$.

69. The cathode of claim 64, wherein $Cu_xM_yO_zX_t$ is $Cu_6InO_8Cl$.

70. The cathode of claim 64, wherein the cathode active material comprises less than about 35 percent by weight $Cu_xM_yO_zX_t$.

71. The cathode of claim 64, wherein the cathode active material comprises less than about 30 percent by weight $Cu_xM_yO_zX_t$.

72. The cathode of claim 64, wherein the cathode active material comprises less than about 25 percent by weight $Cu_xM_yO_zX_t$.

73. The cathode of claim 64, wherein the cathode active material comprises less than about 20 percent by weight $Cu_xM_yO_zX_t$.

74. The cathode of claim 64, wherein the cathode active material comprises less than about 15 percent by weight $Cu_xM_yO_zX_t$.

75. The cathode of claim 64, wherein the cathode active material comprises less than about ten percent by weight $Cu_xM_yO_zX_t$.

76. The cathode of claim 64, wherein the cathode active material comprises less than about five percent by weight $Cu_xM_yO_zX_t$.

77. The cathode of claim 64, wherein the cathode active material comprises less than about two percent by weight $Cu_xM_yO_zX_t$.

78. The cathode of claim 64, wherein x+y is about 6.8.

79. The cathode of claim 64, wherein x+y is about 7.2.

80. The cathode of claim 64, wherein the copper in $Cu_xM_yO_zX_t$ has a formal oxidation state of +2.w and +2.w is from +2.0 to +2.4.

81. The cathode of claim 64, wherein the copper in $Cu_xM_yO_zX_t$ has a formal oxidation state of +2.w and +2.w is from +2.2 to +2.4.

* * * * *